United States Patent
Aso et al.

(10) Patent No.: US 12,195,578 B2
(45) Date of Patent: Jan. 14, 2025

(54) BLOCKING AGENT FOR AN ISOCYANATE GROUP AND ISOCYANATE PROTECTED BY SAID BLOCKING AGENT

(71) Applicant: Shin-Etsu Chemical Co., Ltd., Tokyo (JP)

(72) Inventors: Fumihiro Aso, Annaka (JP); Kohei Masuda, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 325 days.

(21) Appl. No.: 17/778,905

(22) PCT Filed: Nov. 19, 2020

(86) PCT No.: PCT/JP2020/043265
§ 371 (c)(1),
(2) Date: May 23, 2022

(87) PCT Pub. No.: WO2021/106751
PCT Pub. Date: Jun. 3, 2021

(65) Prior Publication Data
US 2023/0062457 A1 Mar. 2, 2023

(30) Foreign Application Priority Data
Nov. 28, 2019 (JP) ................................. 2019-215286

(51) Int. Cl.
| | |
|---|---|
| *C08G 18/80* | (2006.01) |
| *C08G 18/24* | (2006.01) |
| *C08G 18/28* | (2006.01) |
| *C08G 18/62* | (2006.01) |
| *C08G 18/67* | (2006.01) |
| *C08G 18/73* | (2006.01) |
| *C09D 175/04* | (2006.01) |

(52) U.S. Cl.
CPC ......... *C08G 18/809* (2013.01); *C08G 18/246* (2013.01); *C08G 18/289* (2013.01); *C08G 18/6225* (2013.01); *C08G 18/6229* (2013.01); *C08G 18/677* (2013.01); *C08G 18/73* (2013.01); *C09D 175/04* (2013.01)

(58) Field of Classification Search
CPC .. C08G 18/809; C08G 18/246; C08G 18/289; C08G 18/6225; C08G 18/6229; C08G 18/677; C08G 18/73; C09D 175/04
See application file for complete search history.

(56) References Cited

U.S. PATENT DOCUMENTS

| | | |
|---|---|---|
| 3,529,005 A | 9/1970 | Barcza |
| 6,416,861 B1 | 7/2002 | Lee et al. |
| 2016/0340466 A1 | 11/2016 | Hamajima et al. |

FOREIGN PATENT DOCUMENTS

| | | |
|---|---|---|
| CN | 108467504 A | 8/2018 |
| JP | S63132918 A | 6/1988 |
| JP | H07233175 A | 9/1995 |
| JP | 2016216557 A | 12/2016 |

OTHER PUBLICATIONS

Extended European Search Report corresponding to European Patent Application No. 20894237.5 (9 pages) (dated Oct. 26, 2023).
Hudrlik et al. "Generation of Anionic Intermediates by Intramolecular Nucleophilic Attack at Silicon" Tetrahedron Letters, 33(45):6747-6750 (1992).
Carter et al. "A Novel Design Strategy for Blocked Isocyanates to Enhance Their Reactivity With Alcohols. Oxime Blocking Agents Which Undergo Intramolecular Cyclization" Journal of Coatings Technology, 64(805):29-36 (1992).
English translation of International Search Report corresponding to International Patent Application No. PCT/JP2020/043265 (2 pages) (mailed Feb. 2, 2021).
Rolph et al. "Blocked isocyanates: from analytical and experimental considerations to non-polyurethane applications" Polymer Chemistry, 7:7351-7364 (2016).

*Primary Examiner* — Rabon A Sergent
(74) *Attorney, Agent, or Firm* — Myers Bigel, P.A.

(57) ABSTRACT

One of the purposes of the present invention is to provide a blocking agent for blocking an isocyanate group to thereby prepare an isocyanate compound which has excellent water resistance and is react with another polymerizable compound to be cured at a relatively low temperature; and another purpose is to provide a blocked isocyanate having an isocyanate group blocked with the blocking agent. The present invention provides a blocking agent for blocking an isocyanate group, wherein the blocking agent is an organic silicon alcohol having an organic group bonded to a silicon atom and said organic group is capable of forming a β-silyl cation together with the silicon atom. In a preferred embodiment, the present invention provides a blocking agent which is an organic silicon alcohol represented by the general formula (1). In the formula (1), $R^1$ is an alkylene group having 3 to 5 carbon atoms and may have a substituent, provided that the number of carbon atoms of the substituent is not included in the number of the carbon atoms of the alkylene group, $R^2$ is an alkyl group having 1 to 10 carbon atoms, Z is an organic group capable of forming a β-silyl cation together with the silicon atom to which Z bonds, and n is an integer of 1 to 3. The present invention further provides a blocked isocyanate having a structure in which the isocyanate group is blocked with the aforesaid blocking agent and a thermosetting composition comprising the blocked isocyanate.

9 Claims, 8 Drawing Sheets

BLOCKING AGENT FOR AN ISOCYANATE GROUP AND ISOCYANATE PROTECTED BY SAID BLOCKING AGENT

TECHNICAL FIELD

The present invention relates to a blocking agent for an isocyanate group and an isocyanate protected by the blocking agent, more specifically to an isocyanate group blocking agent comprising a silicon-substituted alcohol and a blocked isocyanate using the blocking agent.

BACKGROUND OF THE INVENTION

An isocyanate is widely used as a raw material for polyurethane but it has toxicity and a problem in water resistance as is, so that an isocyanate is used in the form of a so-called blocked isocyanate. Using a blocked isocyanate achieves the preparation of a one-pack type coating or stabilization of a coating and therefore the blocked isocyanate is an industrially very important compound.

A compound used as a blocking agent for blocked isocyanates has an active proton. Blocking agents such as oximes, amides, alcohols, malonates, and pyrazoles are known.

However, conventional blocked isocyanates have problems. For example, an oxime such as methyl ethyl ketoxime is stability over time during blocking reaction and can be removed from the isocyanate at an adequate temperature, so that an oxime is used widely. However, an oxime is easily hydrolysable in nature and not suitable for water-based coatings. Amides such as ε-caprolactam, pyrazoles such as dimethyl pyrazole, and malonates such as diethyl malonate remain in an obtained product after removing them from the blocked isocyanate. Isocyanates blocked with an aliphatic alcohol such as ethanol or butanol are excellent in water resistance. Almost no aliphatic alcohol remains in an obtained product after removing it from the blocked isocyanate. However, the aliphatic alcohol requires a high temperature near 200° C. for removing from the blocked isocyanate and, therefore, such blocked isocyanate had limited applications (Non-Patent Literature 1).

Non-Patent Literature 2 describes an attempt to promote removing a blocking agent from a blocked isocyanate by intramolecular cyclization of the blocking agent. Non-Patent Literature 2 describes that the reactivity is studied by determination of reaction kinetics with a liquid chromatography, however does not mention a clear effect such as a significant lowering of a temperature for removing a blocking agent from a blocked isocyanate. Non-Patent Literature 2 describes that a reaction rate constant is only improved slightly. Non-Patent Literature 2 describes that this is because equilibrium reaction of the blocking and removing is a more rate-determining reaction, compared to the intramolecular cyclization.

PRIOR LITERATURES

NON-PATENT LITERATURES

Non-Patent Literature 1: Polymer Chemistry, 2016, 7, pp. 7351-7364.

Non-Patent Literature 2: Journal of Coatings Technology, 1992, 64(805), pp. 29-36.

SUMMARY OF THE INVENTION

Problems to be Solved by the Invention

The present inventors considered the reasons of no significant lowering of a temperature for removing a blocking agent is attained in Non-Patent Literature 2 and thought that ethanol is occurred in the intramolecular cyclization. Ethanol bonds to an isocyanate after removing a blocking agent and the temperature of removing ethanol from the isocyanate is higher than that of removing oxime from the isocyanate. Since these reactions may be competitive, the method of promoting a removal reaction described in Non-Patent Literature 2 does not become an essential solution for significant lowering of a temperature.

One of the purposes of the present invention is to provide a blocking agent for blocking an isocyanate group to thereby prepare an isocyanate compound which has excellent water resistance and is react with another polymerizable compound to be cured at a relatively low temperature; and another purpose is to provide a blocked isocyanate having an isocyanate group blocked with the blocking agent.

Means for Solving the Problems

The present inventors conducted keen researches to solve the aforesaid problems and has found that a blocked isocyanate obtained by blocking an isocyanate group with a silicon-substituted alcohol having, on a silicon atom thereof, an organic group capable of forming a β-silyl cation has water resistant, comparable to that of an isocyanate blocked with a conventional aliphatic alcohol. The silicon-substituted alcohol can be removed from an isocyanate at a temperature lower by about 50° C. than that for the aliphatic alcohol and, therefore, a thermosetting composition comprising the blocked isocyanate is cured at a relatively low temperature.

That is, the present invention provides a blocking agent for blocking an isocyanate group, wherein the blocking agent is an organic silicon alcohol having an organic group bonded to a silicon atom and said organic group is capable of forming a β-silyl cation together with the silicon atom.

In a preferred embodiment, the present invention provides a blocking agent which is an organic silicon alcohol represented by the following general formula (1):

(1)

wherein $R^1$ is an alkylene group having 3 to 5 carbon atoms and may have a substituent, provided that the number of carbon atoms of the substituent is not included in the number of the carbon atoms of the alkylene group, $R^2$ is an alkyl group having 1 to 10 carbon atoms, Z is an organic group capable of forming a β-silyl cation together with the silicon atom to which Z bonds, and n is an integer of 1 to 3.

The present invention further provides a blocked isocyanate having a structure in which the isocyanate group is blocked with the aforesaid blocking agent and a thermosetting composition comprising the blocked isocyanate.

In the present invention, the "blocking agent" means a compound capable of masking and thereby stabilizing an isocyanate group.

The "blocked isocyanate" means an isocyanate compound having a structure in which the isocyanate group is blocked with a blocking agent, preferably a compound of the aforesaid formula (1), hereinafter referred to as "a blocking agent".

The "removing a blocking agent" means that a blocking agent is left out from a blocked isocyanate group to regenerate the isocyanate group, hereinafter sometimes referred to as "deblock".

Effects of the Invention

A blocked isocyanate having a structure in which the isocyanate is blocked with the blocking agent of the present invention has water resistance comparable to that of a blocked isocyanate having a structure blocked with an aliphatic alcohol. The present blocking agent is removed from the blocked isocyanate at a relatively low temperature and provides an isocyanate which can react with another reactive compound, so that the present blocked isocyanate may be used for a water-based coating.

Further, the blocking agent of the present invention may be decomposed into a volatile aprotic compound after removal from the blocked isocyanate group. This reaction proceeds based on a principle described below. Since the blocking agent is decomposed into a volatile aprotic compound, no blocking agent remains in the resulting product. The blocked isocyanate thus obtained therefore does not have a problem which will be occurred by the remaining blocking agent and is therefore suited as a raw material for polyurethane.

DETAILED DESCRIPTION OF THE INVENTION

The present invention will be described below in detail.

The present invention relates to a blocking agent for blocking an isocyanate group, wherein the blocking agent is an organic silicon alcohol having an organic group bonded to a silicon atom and said organic group is capable of forming a β-silyl cation together with the silicon atom.

The blocking agent of the present invention is preferably an organic silicon alcohol represented by the following general formula (1):

wherein $R^1$ is an alkylene group having 3 to 5 carbon atoms and may have a substituent, provided that the number of carbon atoms of the substituent is not included in the number of the carbon atoms of the alkylene group, $R^2$ is an alkyl group having 1 to 10 carbon atoms, Z is an organic group capable of forming a β-silyl cation together with the silicon atom to which Z bonds, and n is an integer of 1 to 3, preferably 1. $R^2$ is preferably an alkyl group having 1 to 4 carbon atoms, more preferably a methyl group.

The blocking agent of the present invention reacts with an isocyanate group to form a blocked isocyanate group represented by the following formula.

wherein $R^1$, $R^2$, Z and n are as described above.

The blocking agent of the present invention decomposes into an aprotic low-molecular-weight volatile compound after removal from the blocked isocyanate. Therefore, a compound having an active proton derived from the blocking agent removed from the blocked isocyanate is suppressed not to bond again to the isocyanate group and, therefore, a temperature necessary for removal of the blocking agent from isocyanate is lower.

$R^1$ is an alkylene group which has 3 to 5 carbon atoms and may have a substituent. The alkylene group may have a substituent, provided that the number of carbon atoms of the substituent is not included in the number of carbon atoms of the alkylene group. When $R^1$ has 3 to 5 carbon atoms, the removal reaction from the blocked isocyanate and the decomposition reaction readily proceed, which are preferred. $R^1$ is most preferably a trimethylene group, which will be more specifically described below.

For example, the decomposition reaction of a compound (1) in which $R^1$ is a trimethylene group, $R^2$ is a methyl group, Z is an allyl group and n is 1 is shown in the following reaction formula (i).

In the aforesaid reaction, the formation of a siloxane bond (Si—O) and the removal of Z—H (when Z is an allyl group, Z—H is propylene) may proceed with the formation of β-silyl cation on the allyl group as a trigger. The aforesaid reaction is an organic ring formation reaction and conforms to Baldwin's rules. For example, when $R^1$ has 3 to 5 carbon atoms as shown in the aforesaid formula (i), the reaction is a 5-exo-tet type and is known to easily proceed. A trimeth- ylene group is particularly preferred. When $R^1$ has 2 or less carbon atoms, the reaction is a 4-exo-tet type, which is not preferred because a ring strain is larger. When $R^1$ has more than 6 carbon atoms, the reaction is an 8-exo-tet type and is so-called medium ring synthesis, which is not preferred.

The alkylene chain represented by $R^1$ may have a substituent thereon. This substituent is preferably introduced based on the Thorpe-Ingold effect (J. Chem. Soc., Trans. 107, pp. 1080-1106). For example, when $R^1$ is a 2,2-dimethyl-trimethylene group, intramolecular cyclization is expected to smoothly proceed due to the Thorpe-Ingold effect. The substituent may be introduced, if necessary, for example, for controlling a reaction rate and does not preclude the use of an unsubstituted alkylene group. Examples of the substituent include alkyl groups such as methyl, ethyl, n-propyl, isopropyl, n-butyl, sec-butyl, isobutyl, and tert-butyl groups.

Z is a group capable of forming a β-silyl cation together with the silicon atom in the aforesaid formula (1). Preferred is a group selected from the group consisting of allyl, 2-methylallyl, 2-methoxyallyl, crotyl, phenyl, 4-methylphenyl, 4-methoxyphenyl, and benzyl groups.

The aforesaid Z functions as a leaving group for the silicon atom in the aforesaid formula (1) and Z is expected to have an effect of improving Lewis's acidity of a silicon due to the stereoelectronic effect and promote the intramolecular cyclization of the aforesaid compound of the formula (1).

A mechanism of Z (allyl group) forming a β-silyl cation and leaving from the silicon atom in the aforesaid decomposition reaction (i) will be described more detail by the following reaction formula (ii).

In the aforesaid formula (ii), the double bond of the allyl group which bonds to the silicon atom is activated by an acid represented by a proton (as shown in the aforesaid (a)) to form a β-silyl cation (as shown in the aforesaid (b)). Then, propylene is removed from the silicon atom, followed by the intramolecular cyclization of the compound of the formula (1) occurs (as shown in the aforesaid (c)). By such a reaction mechanism, the compound of the formula (1) is presumed to be removed from the isocyanate and then to be decomposed. When Z is a group analogous to the allyl group such as a 2-methylallyl group, a 2-methoxyallyl group, or a crotyl group, these groups occur the removal reactions and the decomposition by a similar mechanism such that the aforesaid scheme (ii), so that these groups are also preferably usable.

When Z is a 4-methylphenyl group, for example, when Z is a 4-methylphenyl group, $R^2$ is a methyl group and n is 1 in the aforesaid formula (1), the decomposition reaction of the compound has a mechanism as described by the following reaction formula (iii).

In the formula (iii), an aromatic electrophilic substitution reaction occurs at a position whose hydrogen atom is substituted with a silicon on the benzene ring (as shown in the aforesaid (a)). This is called "ipso substitution" which is a substitution manner peculiar to silylbenzene. By the ipso substitution, a β-silyl cation is formed (as shown in the aforesaid (b)). Then, toluene is removed from the silicon atom, leading to intramolecular cyclization (as shown in the aforesaid (c)). By such a reaction mechanism, the compound of the aforesaid formula (1) is presumed to be removed from the isocyanate and then to be decomposed. Also, when Z is a group analogous to the 4-methylphenyl group such as a phenyl group, a 4-methoxyphenyl group, or a benzyl group, these groups occur the removal reactions and the decomposition by the similar mechanism such that the aforesaid (iii), so that these groups are preferably applicable.

The blocking agent of the present invention is characterized in that Z is the organic group capable of forming the β-silyl cation together with the silicon atom adjacent to Z in order to promote the aforesaid reaction. Examples of the Z include allyl, 2-methylallyl, 2-methoxyallyl, crotyl, phenyl, 4-methylphenyl, 4-methoxyphenyl, and benzyl groups, but are not limited to them. Z is more preferably an allyl, 2-methylallyl, or 4-methylphenyl group in view of the properties, such as boiling point and toxicity, of the molecule after leaving.

The organic silicon compound is known to have, as one of its essential reactivities, a stabilizing effect of a β-silyl cation. Electrons in a σ bond on a silicon are known to flow into the empty p* orbital of a carbocation separated by 2 carbons to produce an effect of stabilizing a cation, which is called σ-p* hyperconjugation. The stabilization of a β-silyl cation is known as one of the basic principles of Hosomi-Sakurai Reaction known as allylation using allylsilane, Tetrahedron Letters, 17, pp. 1295-1298. The promotion of removal a blocking agent from a blocked isocyanate making use of the reactivity of a β-silyl cation is not known.

Blocked Isocyanate

The present invention provides a blocked isocyanate having an isocyanate group blocked with the aforesaid blocking agent. More specifically, the blocked isocyanate of the present invention is represented by the following formula (2).

(2)

wherein $R^1$, $R^2$, Z and n are as described above and R' is a residue of an organic compound having 1 to 6 isocyanate groups and k is an integer of 1 to 6, preferably an integer of 1 to 3. R' is preferably a residue of a monoisocyanate, a diisocyanate, or a triisocyanate, more specifically a residue of an isocyanate described later.

Method of Preparing a Blocked Isocyanate

The blocked isocyanate of the present invention is obtained by reacting the aforesaid blocking agent of the present invention with an isocyanate compound, if needed, in an aprotic organic solvent. Examples of the isocyanate compound to be blocked include monoisocyanates such as allyl isocyanate, methyl isocyanate, phenyl isocyanate, 3-alkoxysilylpropyl isocyanate, and 2-(meth)acryloylethyl isocyanate; diisocyanates such as hexamethylene diisocyanate, isophorone diisocyanate, toluene diisocyanate, and hydrogenated toluene diisocyanate; triisocyanates obtained by crosslinking hexamethylene diisocyanate, isophorone diisocyanate, toluene diisocyanate, or hydrogenated toluene isocyanate via an isocyanuric skeleton; and a mixture of one or more of them.

The aforesaid blocking agent may be reacted with the isocyanate compound under reaction conditions similar to those for a conventional blocking agent. In order to suppress the thermal decomposition of the blocking agent of the present invention, a reaction temperature is preferably 0 to 100° C., more preferably 20 to 80° C. and a reaction time is preferably 1 to 24 hours, more preferably 2 to 12 hours.

The removal reaction of the aforesaid blocking agent from the blocked isocyanate may be conducted under conditions similar to the removal conditions for removing an aliphatic alcohol as a blocking agent from a blocked isocyanate, but the removal of the present blocking agent from the blocked isocyanate (deblock reaction) may be conducted at a relatively low temperature. More specifically, the blocking agent of the present invention may be removed at a reaction temperature of preferably 120 to 200° C., more preferably 140 to 180° C., for a reaction time of preferably 0.5 to 12 hours, more preferably 1 to 6 hours. The aforesaid temperature and time are under reaction conditions lacking nucleophilic agent and the temperature and time may be changed, depending on the presence or absence, or type of a nucleophilic agent in the reaction system.

The present invention further provides a thermosetting composition comprising the aforesaid blocked isocyanate. For example, the thermosetting composition comprises the blocked isocyanate of the present invention and a hydroxyl group-containing acrylate compound. Since the blocked isocyanate of the present invention is regenerated into an isocyanate group by removal of the blocking agent, the isocyanate reacts with the hydroxyl group-containing acrylate compound to cure and form a polyurethane. For example, an amount of the blocked isocyanate in the acrylate compound-containing thermosetting composition is preferably such that a molar ratio of the deblocked isocyanate group per mol of the hydroxyl group of the acrylate compound is 0.5 to 2, more preferably 0.8 to 1.2. A cured film obtained from the composition having such a molar ratio is excellent in hardness and crack resistance. The acrylate compound is not particularly limited, but examples of the acrylate compound include homopolymers of a hydroxyl group-containing acrylate monomer such as 2-hydroxyethyl methacrylate (HEMA), 2-hydroxyethyl acrylate, 2-hydroxypropyl acrylate, or 2-hydroxybutyl acrylate; and copolymers of the aforesaid hydroxyl group-containing acrylate monomer and methyl methacrylate (MMA). The blocked isocyanate of the present invention may be deblocked at a relatively low temperature as described above and, therefore, the thermosetting composition comprising the blocked isocyanate may be cured at a relatively low temperature. The curing temperature is preferably 120 to 200° C., more preferably 140 to 180° C. and the curing time is preferably 0.5 to 12 hours, more preferably 1 to 6 hours.

EXAMPLES

The present invention will be explained below in further detail with reference to a series of the Synthesis Examples, Examples, and Comparative Examples, though the present invention is no way limited by the following Examples.

Synthesis Example 1

Synthesis of 3-allyldimethylsilyl Propanol

Figure 1:
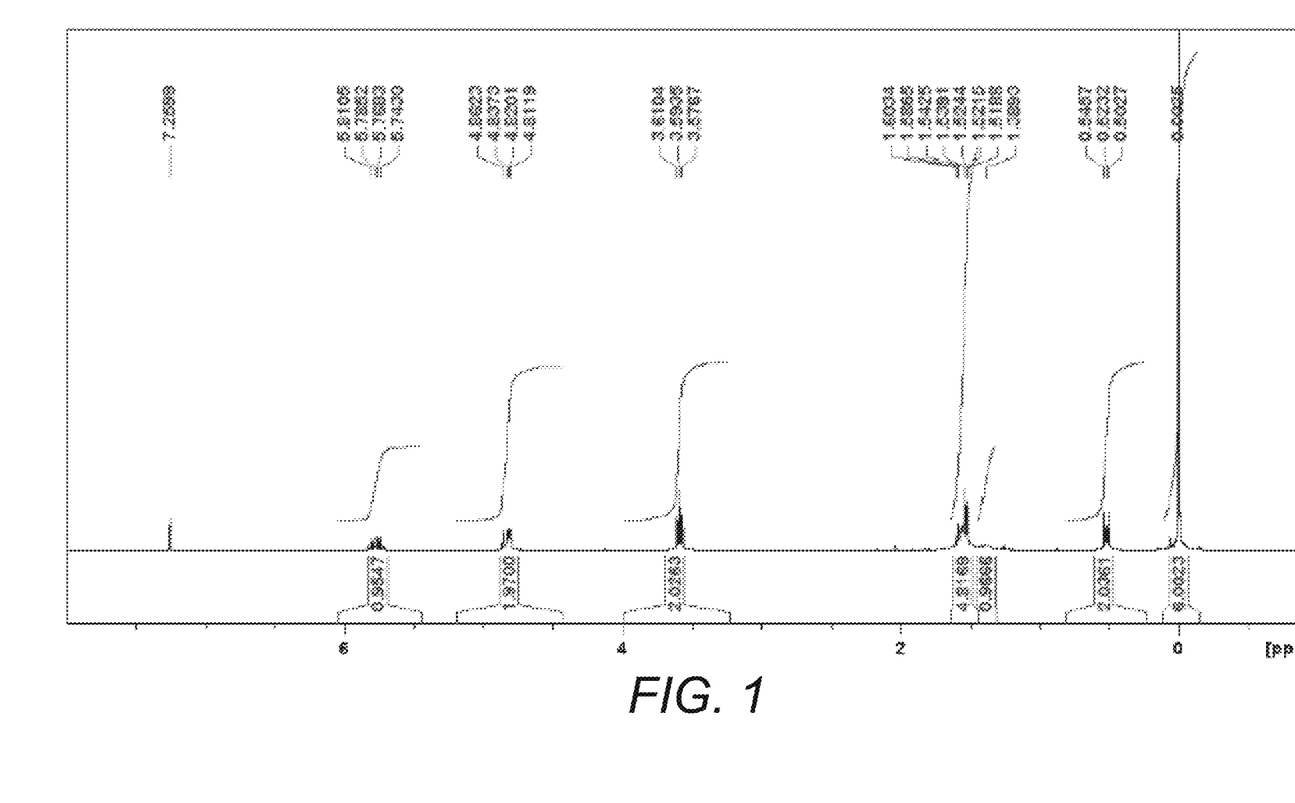
FIG. 1 is $^1$H-NMR spectra of 3-allyldimethylsilylpropanol obtained in Synthesis Example 1.
Figure 2:
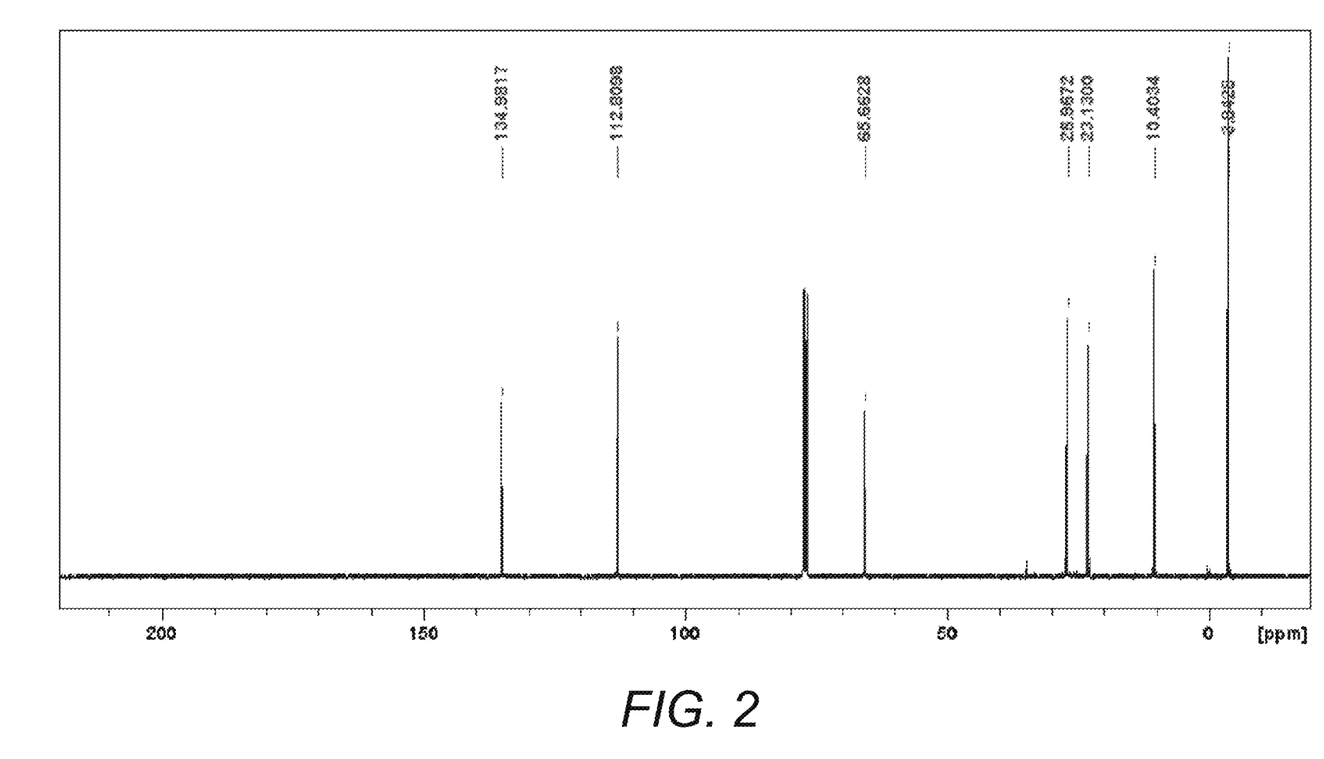
FIG. 2 is $^{13}$C-NMR spectra of 3-allyldimethylsilylpropanol obtained in Synthesis Example 1.

A 500 mL four-necked flask equipped with a dropping funnel, a Dimroth cooler condenser, a stirring device, and a thermometer was sufficiently charged with nitrogen. Diallyldimethylsilane (7.6 g) and THF (150 ml) were placed to the flask and the contents in the flask were cooled in an ice bath while ventilating with nitrogen. Then, a 0.5 M solution of 9-borabicyclo[3.3.1]nonane (54 ml) was added dropwise thereto. The mixture had a transparent and uniform appearance. After stirring at room temperature for 3 hours, the contents in the flask were cooled again in an ice bath. A 3 M aqueous NaOH solution (27 ml) and 30% aqueous hydrogen peroxide (33 ml) were added to the flask, followed by shaking. After stirring at room temperature for one hour, 100 ml of water and 150 ml of hexane were added thereto. The organic phase comprising hexane was separated and anhydrous sodium sulfate (20 g) was added thereto. After filtration, the volatile component was removed by a vacuum pump to obtain a transparent oily liquid (4.3 g). The product obtained was analyzed by $^1$H-NMR and $^{13}$C-NMR and was found to be a compound was 3-allyldimethylsilyl propanol. $^1$H-NMR spectra are shown as FIG. 1 and $^{13}$C-NMR spectra are shown as FIG. 2. $^1$H-NMR (400 MHz, CDCl$_3$) δ5.8-5.7 (Q, J=9.0 Hz, 1H), 4.8(m, 2H), 3.6-3.5 (t, J=4.5 Hz, 2H), 1.6-1.5(m, 4H), 1.3(br-s, 1H), 0.5(t, J=8.6 Hz, 2H), 0.0(s, 6H), $^{13}$C-NMR (100 MHz, CDCl$_3$) δ 134.9, 112.8, 65.6, 26.9, 23.1, 10.4, −3.8

Synthesis Example 2

Synthesis of 3-(4-methylphenyl)dimethylsilyl Propanol

A 200 mL four-necked flask equipped with a dropping funnel, a Dimroth cooler condenser, a stirring device, and a thermometer was sufficiently charged with nitrogen. Allyloxytrimethylsilane (13.0 g), 1,5-cyclooctadiene (8 ml), and di-μ-chlorobis(μ-1,5-cyclooctadiene)diiridium (0.06 g) were placed to the flask and the mixture was heated to 80° C. while ventilating with nitrogen. Then, chlorodimethylsilane (9.5 g) was added dropwise thereto and allowed to react at 80° C. for 6 hours. A 0.7 M solution of 4-methylphenylmagnesium bromide in THF was added dropwise and the reaction mixture was heated under reflux for 2 hours again. After cooling the mixture to room temperature, 100 ml of a 1 N aqueous hydrochloric acid solution and 150 ml of ethyl acetate were added thereto. The organic phase comprising ethyl acetate was separated and anhydrous sodium sulfate (20 g) was added. After filtration, the volatile component was distilled under reduced pressure. To the residue, 20 ml of a 1 N aqueous hydrochloric acid solution and 150 ml of methanol were added and the resulting mixture was stirred at room temperature for 3 days. The volatile component was removed by a vacuum pump to obtain an oily liquid (14.5 g). The product obtained was analyzed by $^1$H-NMR and $^{13}$C-NMR and was found to be a compound was 3-(4-methylphenyl)dimethylsilyl propanol.

Figure 3:
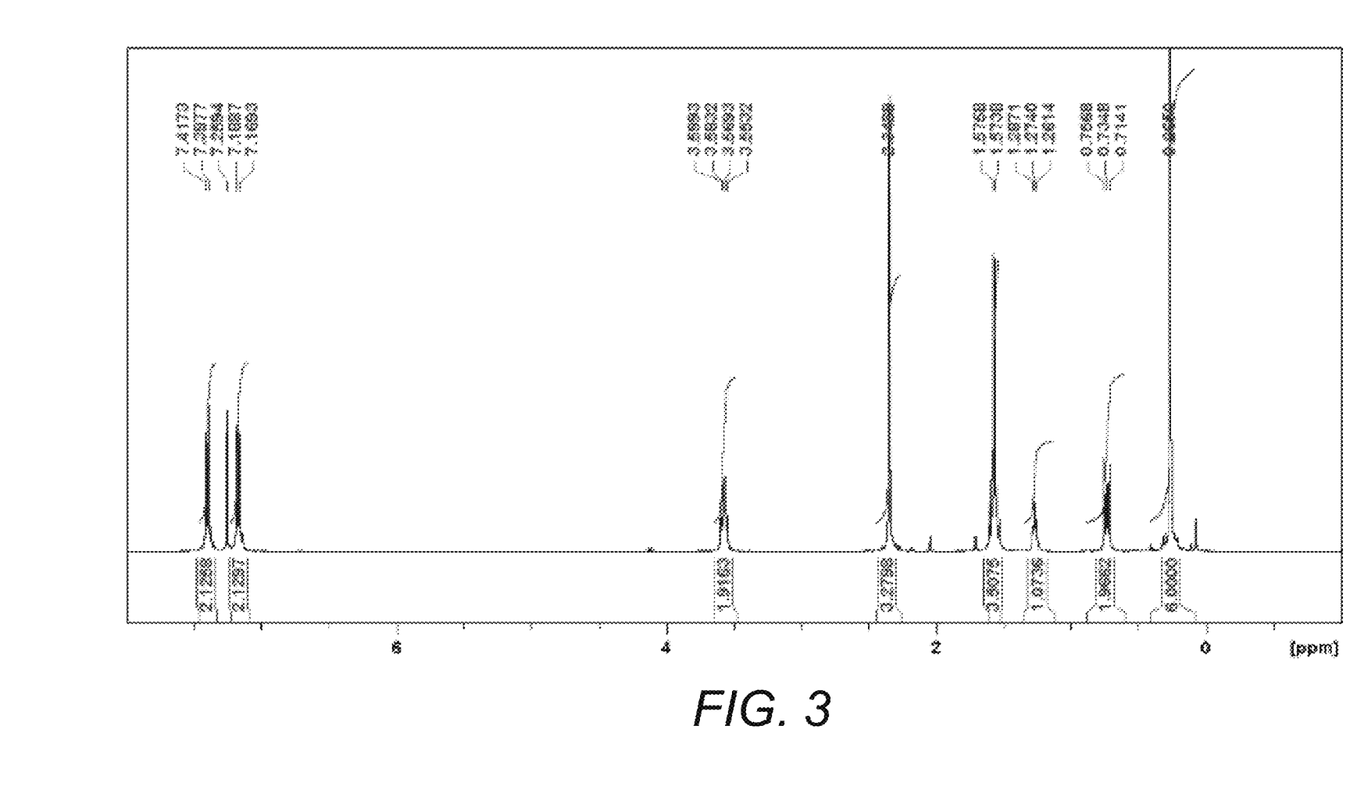
FIG. 3 is $^1$H-NMR spectra of 3-(4-Methylphenyl) dimethylsilylpropanol obtained in Synthesis Example 2.
Figure 4:
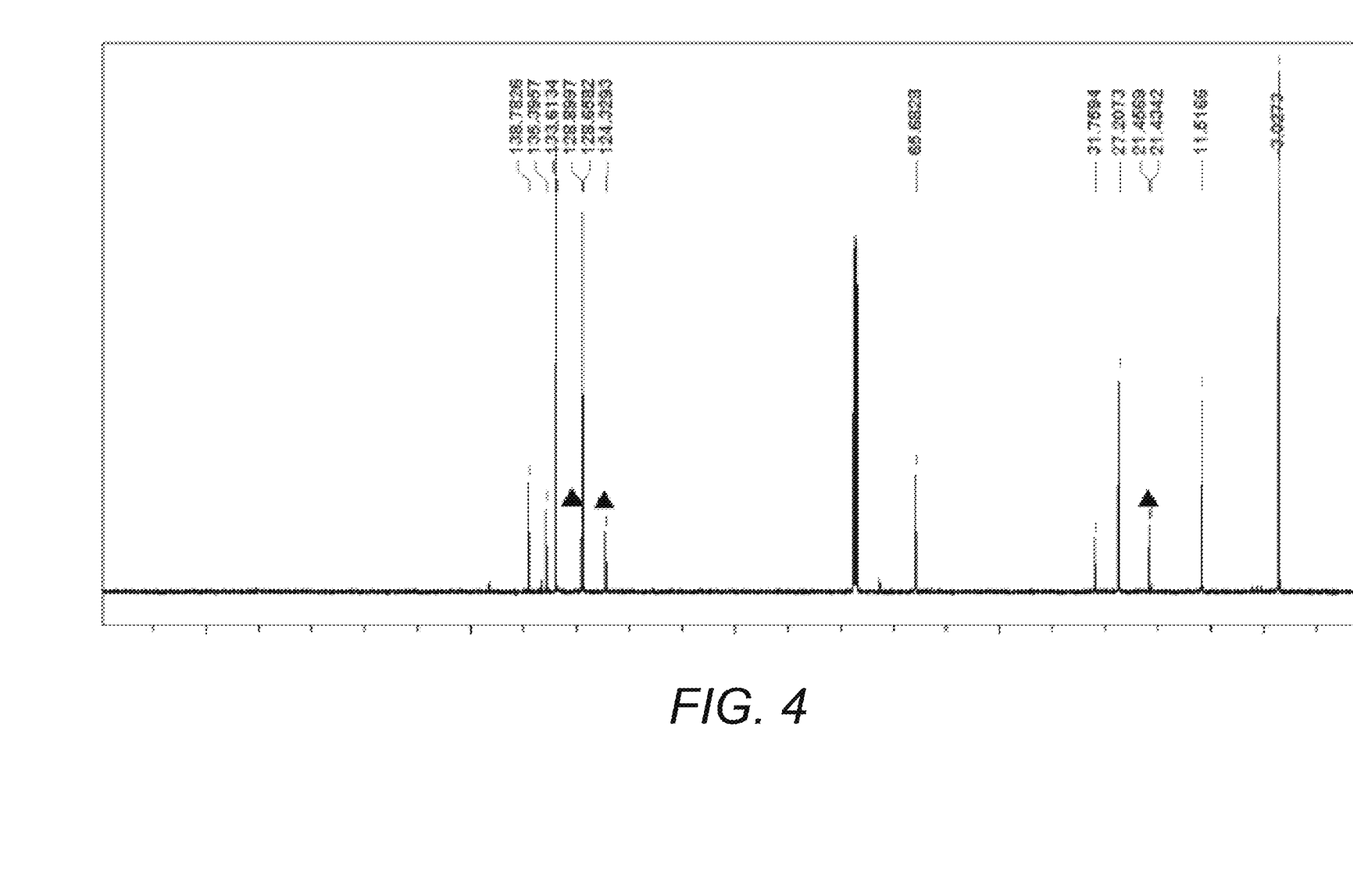
FIG. 4 is $^{13}$C-NMR spectra of 3-(4-Methylphenyl) dimethylsilylpropanol obtained in Synthesis Example 2.

$^1$H-NMR spectra are shown as FIG. 3 and $^{13}$C-NMR spectra are shown as FIG. 4. NMR (400 MHz,CDCl$_3$) δ7.4-7.3 (d, J=7.8 Hz, 2H) , 7.1(d, J=7.8 Hz, 2H), 3.5 (q, J=6.1 Hz, 2H), 2.3(s, 3H), 1.5(m, 4H), 1.2(br-s, 1H), 0.7(t, J=8.5 Hz, 2H), 0.2(s, 6H), $^{13}$C-NMR (100 MHz, CDCl$_3$) δ138.7, 135.3, 133.6, 128.6, 65.6, 31.7, 27.2, 11.5, −3.0, The signals marked with ▲ is derived from toluene.

Example 1

Synthesis of Blocked Isocyanate 1

A 10 mL eggplant flask in which a stirrer was placed was sufficiently charged with nitrogen. Hexamethylene diisocyanate (168 mg) and 3-allyldimethylsilyl propanol (332 mg) were added in the eggplant and heated at 80° C. for 2 hours. According to the IR spectra of the product, the disappearance of the isocyanate was confirmed. According to $^1$H-NMR and $^{13}$C-NMR analysis, a reaction between hexamethylene diisocyanate and 3-allyldimethylsilyl propanol was confirmed. This means that hexamethylene diisocyanate whose isocyanate group was blocked with 3-allyldimethylsilyl propanol was obtained (Blocked isocyanate 1).

Figure 5:
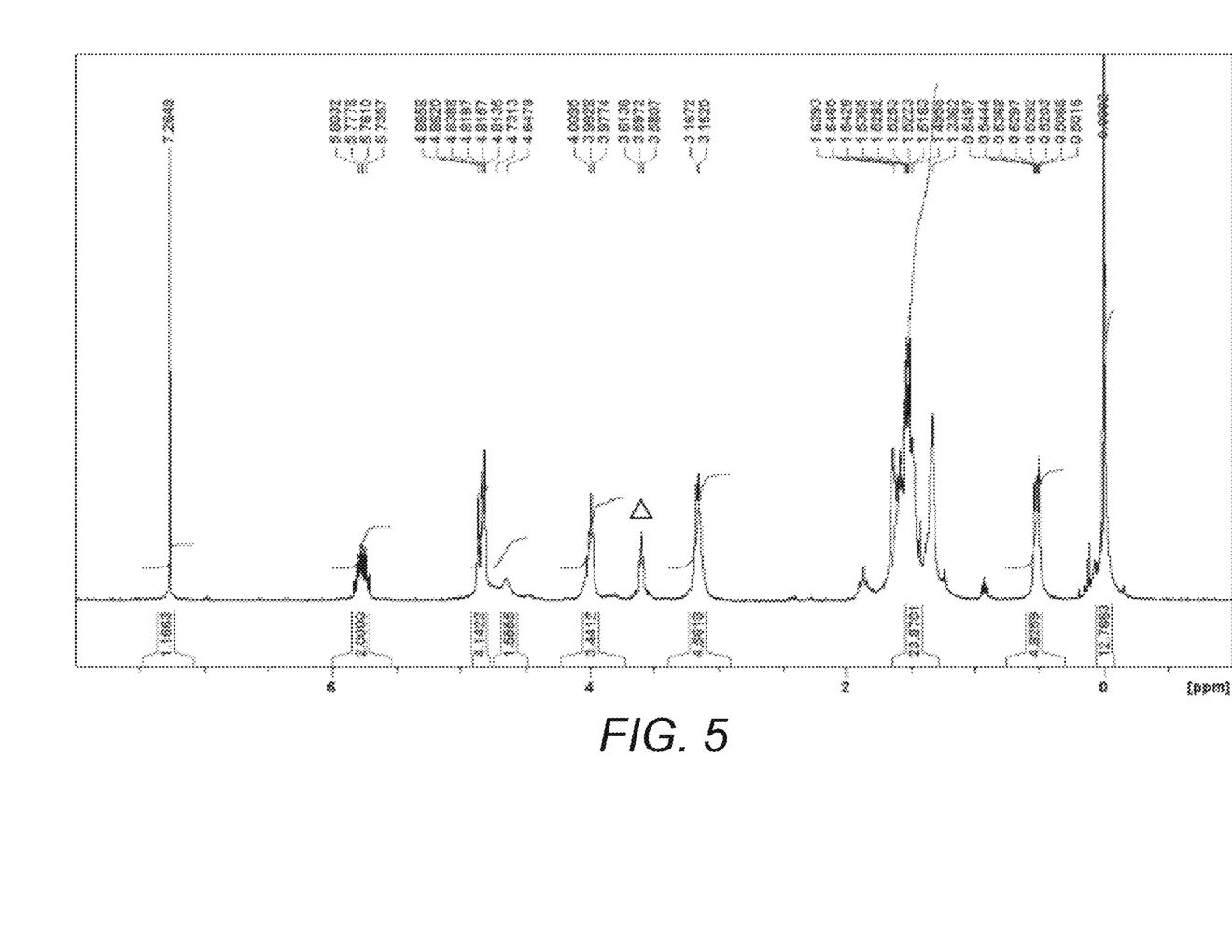
FIG. 5 is $^1$H-NMR spectra of blocked isocyanate 1 obtained in Example 1.
Figure 6:
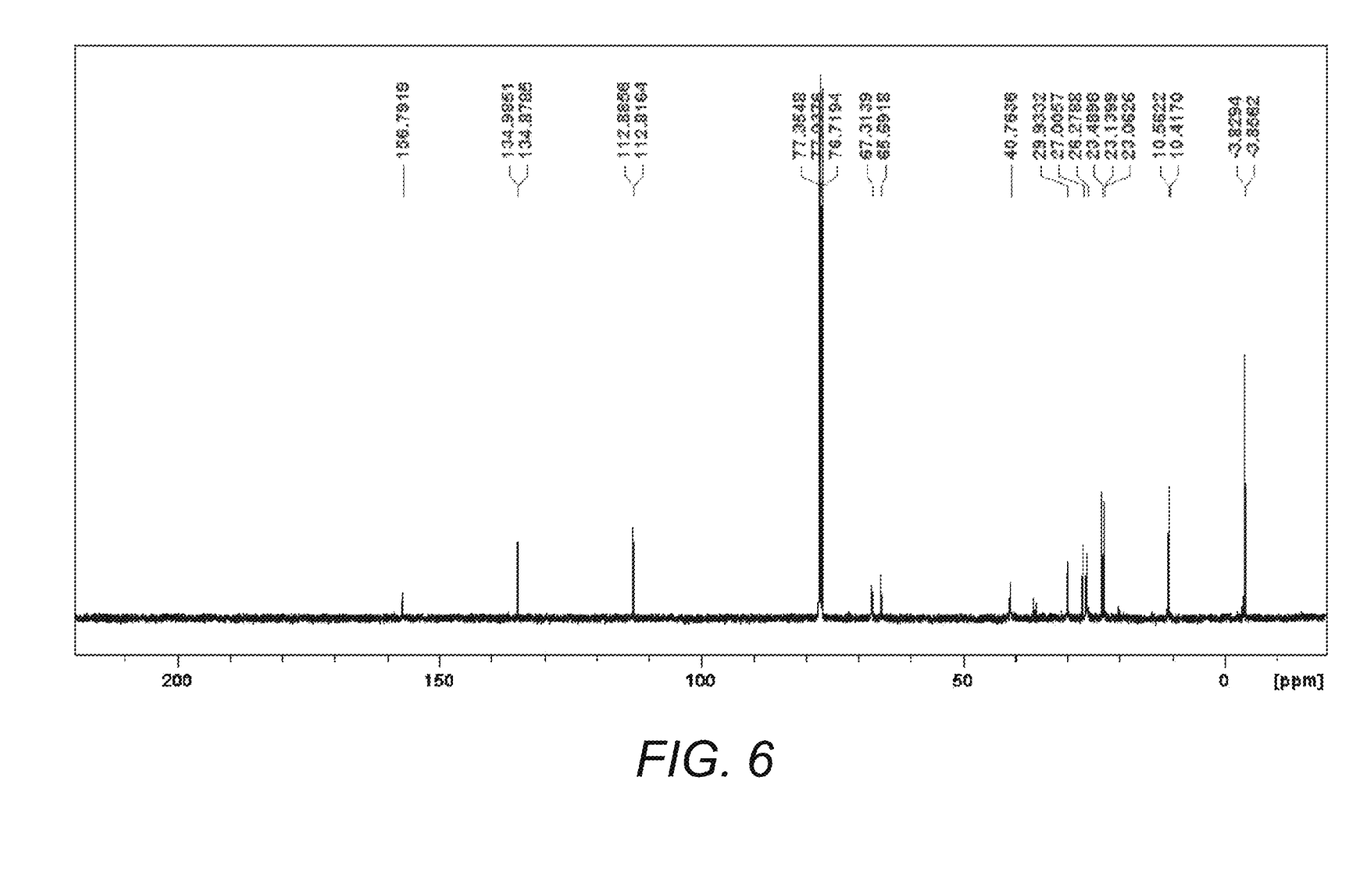
FIG. 6 is $^{13}$C-NMR spectra of blocked isocyanate 1 obtained in Example 1.

$^1$H-NMR spectra are shown as FIG. 5 and $^{13}$C-NMR spectra are shown as FIG. 6. $^1$H-NMR (400 MHz, CDCl$_3$) δ5.8-5.7(m, 2H), 4.8(m, 4H), 4.6(br-s, 2H), 4.0-3.9 (t, J=6.4 Hz, 4H), 3.1(br-m, 4H), 1.6-1.5 (m, 16H), 0.5(m, 4H), 0.0(s, 12H)

The signal marked with Δ is derived from raw material.
$^{13}$C-NMR(100 MHz, CDCl$_3$) M56.7, 134.9-134.8, 112.8, 67.3, 65.6, 40.7, 29.9, 27.0-26.2, 23.4-23.0, 10.5-10.4, −3.8

The 3-allyldimethylsilyl propanol obtained in Synthesis Example 1 and Blocked isocyanate 1 obtained in Example 1 were each analyzed using a Headspace gas chromatograph/mass spectrometer (HP6890; ex Agilent Technologies Japan Ltd., a sampling temperature: headspace oven at 50° C., loop at 60° C., and transfer line at 70° C., a measurement temperature at 50° C. to 250° C., and a heating rate at 10° C/min) to detect a five-membered ring silane (m/z: 116), a decomposition product derived from the blocking agent.

The 3-allyldimethylsilyl propanol obtained in Synthesis Example 1 and Blocked isocyanate 1 obtained in Example 1 were each heated at 150° C. for 60 minutes. Then, propylene which is a decomposition product derived from the blocking agent was detected by a propylene detector tube (gas detector tube 185 S propylene, ex Komyo Rikagaku Kogyo K. K.).

Example 2

Synthesis of Blocked Isocyanate 2

The procedures of Example 1 were repeated, except that 3-allyldimethylsilyl propanol was changed to 3-(4-methylphenyl)dimethylsilyl propanol, to thereby obtain hexamethylene diisocyanate whose isocyanate group was blocked with 3-(4-methylphenyl)dimethylsilyl propanol (Blocked isocyanate 2).

Figure 7:
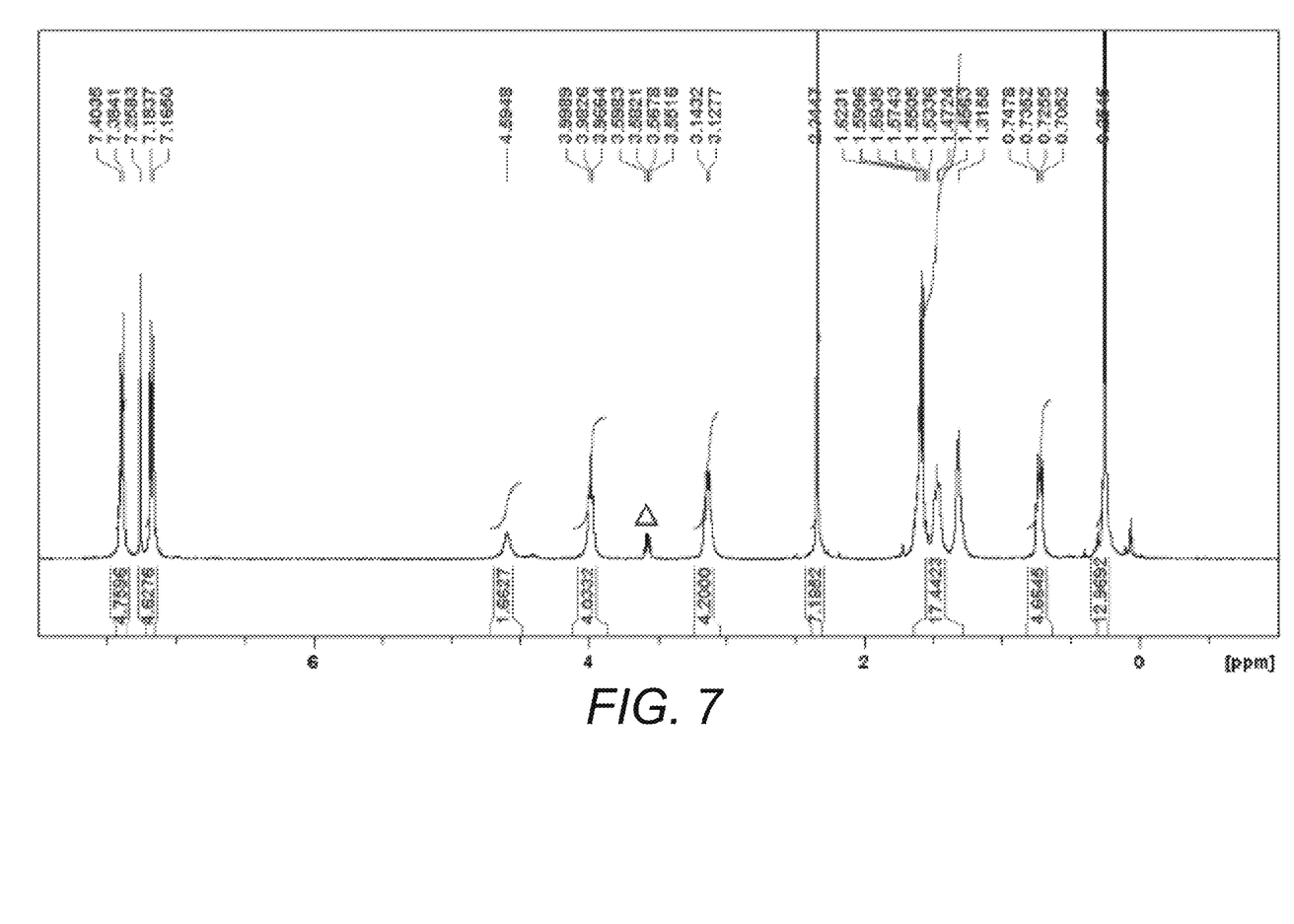
FIG. 7 is $^1$H-NMR spectra of blocked isocyanate 2 obtained in Example 2.
Figure 8:
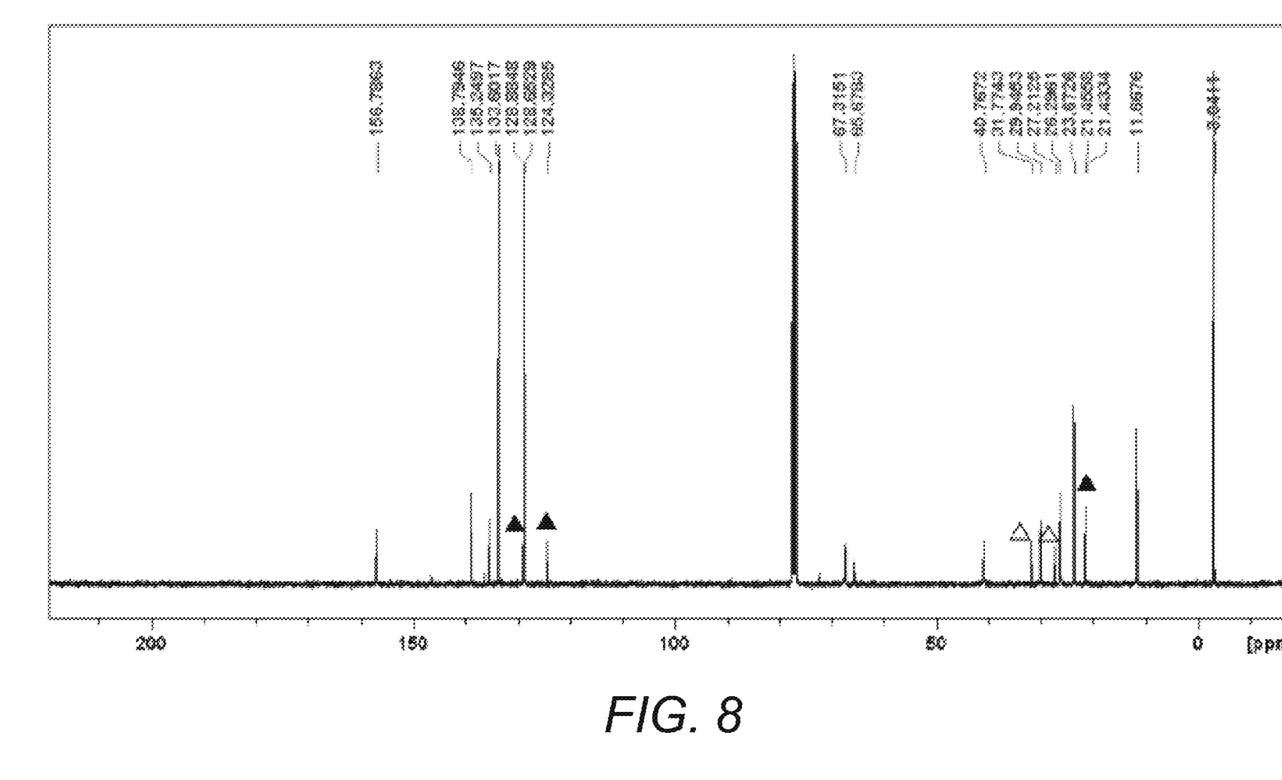
FIG. 8 is $^{13}$C-NMR spectra of blocked isocyanate 2 obtained in Example 2.

$^1$H-NMR spectra are shown as FIG. 7 and $^{13}$C-NMR spectra are shown as FIG. 8. $^1$H-NMR(400 MHz, CDCl$_3$) δ7.4-7.3 (d, J=7.7Hz, 4H), 7.1(d, J=7.5 Hz, 4H), 4.5(br-s, 2H), 3.9(t, 6.5 Hz, 4H), 3.1(br-m, 4H), 2.3(s, 6H)1.6-1.3(m, 12H), 0.7(m, 4H), 0.2(s, 12H)

The signal marked with ▲ is derived from the raw material.
$^{13}$C-NMR(100 MHz, CDCl$_3$)
δ 156.7, 138.7, 135.2, 133.6, 128.6, 67.3, 65.6, 40.7, 29.9, 26.2, 23.6, 11.6, -3.0

The signals marked with Δ are derived from toluene and the signal marked with Δ is derived from the raw material.

The 3-(4-methylphenyl)dimethylsilyl propanol obtained in Synthesis Example 2 and Blocked isocyanate 2 obtained in Example 2 were each analyzed using a Headspace gas chromatograph/mass spectrometer (HP6890 ex Agilent Technologies Japan Ltd., sampling temperature: headspace oven at 50° C., loop at 60° C., transfer line at 70° C., measurement temperature at 50° C. to 250° C., heating rate at 10° C/min) to detect a five-membered ring silane (m/z: 116) which is a decomposition product derived from the blocking agent, and toluene (m/z: 92).

Comparative Example 1

Synthesis of Blocked Isocyanate 3

The procedures of Example 1 were repeated, except that 3-allyldimethylsilyl propanol was changed to methyl ethyl ketoxime, to thereby obtain Blocked isocyanate 3. The $^1$H-NMR and $^{13}$C-NMR spectra of the aforesaid Blocked isocyanate 3 were equal to the known spectrum data of hexamethylene diisocyanate whose isocyanate group was blocked with methyl ethyl ketoxime.

Comparative Example 2

Synthesis of Blocked Isocyanate 4

The procedures of Example 1 were repeated, except that 3-allyldimethylsilyl propanol was changed to ethanol, to thereby obtain Blocked isocyanate 4. The $^1$H-NMR and $^{13}$C-NMR spectra of the aforesaid isocyanate were equal to the known spectrum data of hexamethylene diisocyanate whose isocyanate group was blocked with ethanol.

Evaluation of Curability of Thermosetting Compositions

The blocked isocyanate prepared in Examples 1 and 2 or Comparative Examples 1 and 2 was, respectively, mixed with an acrylic polymer composed of methyl methacrylate (MMA) and hydroxyethyl methacrylate (HEMA) (MMA/HEMA=9/1, Mw=10×10$^4$, Mw/Mn=2.0), with which tin dimethyl dilaurate was further mixed to thereby a thermosetting composition was obtained. A ratio of the number of the blocked isocyanate groups to the number of hydroxyl groups was 1:1. An amount of the tin dimethyl dilaurate was 0.1 mass %, relative to the mass of the composition to be obtained. Curing temperature and water resistance of the resulting compositions were evaluated.

In Table 1, the aforesaid thermosetting composition was applied so as to a be thickness of 10 μm on a glass plate (MICRO SLIDE GLASS 52112, ex MATSUNAMI), heated for 60 minutes at the temperature as shown in the following table and, then, cooled to 25° C. to form a film. The resulting film was subjected to a methanol rubbing test and, thereby, the cured state was observed and the curing temperature was evaluated. The methanol rubbing test was conducted using Bemcot M-3II (ex Asahi Kasei Corporation, area: 4 cm$^2$) immersed in methanol, under a load of 500 g, and with 50 reciprocating motions. After the rubbing test, haze (HAZE, %) was determined using a haze meter (NDH2000, ex Nippon Denshoku Industries Co., Ltd.) according to JIS K 7136:2000. The thermosetting composition whose difference in haze before and after rubbing (AHAZE) was less than 0.1 point was evaluated as Excellent (E); the thermosetting composition whose difference was 0.1 to 1 point was evaluated as Good (G); and the thermosetting composition whose difference was more than 1 point was evaluated as Poor (P).

The thermosetting composition before curing was molded in a form of a film. The film was immersed in a mixture of 1:1 of IPA : water for 1 minute, and thereby the water resistance was evaluated. The composition without cracks was evaluated as Good (G) and the composition with cracks was evaluated as Poor (P).

TABLE

| Curing Temperature, ° C. | Example 1 | Example 2 | Comparative Example 1 | Comparative Example 2 |
| --- | --- | --- | --- | --- |
| 200 | E | E | E | E |
| 190 | E | E | E | E |
| 180 | E | E | E | G |
| 170 | E | E | E | G |
| 160 | E | E | E | P |
| 150 | E | G | E | P |
| 140 | E | G | E | P |
| 130 | G | P | E | P |
| 120 | P | P | G | P |
| 110 | P | P | P | P |
| water resistance | G | G | P | G |

As seen in Table 1, the blocked isocyanate of the present invention has water resistance comparable to that of the isocyanate blocked with a conventional aliphatic alcohol (Comparative Example 2). Compared with the blocked isocyanate of Comparative Example 2, the blocked isocyanate of the present invention can be cured at a temperature as low as about 50° C., which shows that the blocking agent of the present invention can be removed (deblocked) from the isocyanate at a temperature lower than that of the aliphatic alcohol. In other words, the thermosetting composition comprising the blocked isocyanate according to the present invention can be cured at a relatively low temperature and a film thus obtained has excellent in water resistance.

INDUSTRIAL APPLICABILITY

The blocking agent of the present invention provides a water dispersible blocked isocyanate having adequate reactivity. The blocked isocyanate of the present invention as a primer for a water-based coating is useful for shortening a coating step and energy saving, because the primer has excellent water resistance as an uncured primer (so-called B stage primer) and, therefore, a lamination coating of the water-based coating may be conducted without a heating and curing step of the primer.

The invention claimed is:

1. A blocked isocyanate having a structure wherein an isocyanate group is blocked with a blocking agent represented by the following general formula (1);

(1)

wherein R$^1$ is an alkylene group having 3 to 5 carbon atoms that is unsubstituted or substituted with a substituent, provided that the number of carbon atoms of the substituent is not included in the number of the carbon atoms of the alkylene group, R$^2$ is an alkyl group having 1 to 10 carbon atoms, Z is an organic group capable of forming a β-silyl cation together with the silicon atom to which Z bonds, and n is an integer of 1 to 3.

2. The blocked isocyanate according to claim 1, wherein Z is selected from the group consisting of allyl, 2-methylallyl, 2-methoxyallyl, crotyl, phenyl, 4-methylphenyl, 4-methoxyphenyl and benzyl groups.

3. The blocked isocyanate according to claim 1, wherein R$^1$ is a trimethylene group.

4. A thermosetting composition comprising the blocked isocyanate according to claim 1.

5. A cured product obtained by curing the thermosetting composition according to claim 4.

6. The blocked isocyanate according to claim 1, represented by the following general formula (2):

(2)

wherein R$^1$ is an alkylene group having 3 to 5 carbon atoms that is unsubstituted or substituted with a substituent, provided that the number of carbon atoms of the substituent is not included in the number of the carbon atoms of the alkylene group, R$^2$ is an alkyl group having 1 to 10 carbon atoms, Z is an organic group capable of forming a β-silyl cation together with the silicon atom to which Z bonds, and n is an integer of 1 to 3, and R' is a residue of an organic compound having 1 to 6 isocyanate groups and k is an integer of 1 to 6.

7. The blocked isocyanate according to claim 6, wherein R' in the formula (2) is a residue of a monoisocyanate, a diisocyanate, or a triisocyanate.

8. The blocked isocyanate according to claim 6, wherein Z in the formula (2) is selected from the group consisting of allyl, 2-methylallyl, 2-methoxyallyl, crotyl, phenyl, 4-methylphenyl, 4-methoxyphenyl, and benzyl groups.

9. The blocked isocyanate according to claim 6, wherein $R^1$ is a trimethylene group.

* * * * *

UNITED STATES PATENT AND TRADEMARK OFFICE
CERTIFICATE OF CORRECTION

PATENT NO. : 12,195,578 B2
APPLICATION NO. : 17/778905
DATED : January 14, 2025
INVENTOR(S) : Aso et al.

It is certified that error appears in the above-identified patent and that said Letters Patent is hereby corrected as shown below:

In the Specification

Column 1, Lines 26-27: Please remove the paragraph break between "known." and "However,"

Column 7, Line 15: Please insert a paragraph break between "agent." and "More specifically"

Column 8, Line 56: Please correct "3 M" to read --3M--

Column 9, Line 62: Please correct "M56.7," to read --$\delta$156.7,--

Column 10, Line 11: Please correct "185 S" to read --185S--

Column 10, Line 29: Please correct "▲" to read --△--

Column 10, Line 34: Please correct "△" to read --▲--

Column 11, Line 29: Please correct "(AHAZE)" to read --($\Delta$HAZE)--

Column 12, Line 21: Please correct "(1);" to read --(1):--

Signed and Sealed this
Eighth Day of July, 2025

Coke Morgan Stewart
*Acting Director of the United States Patent and Trademark Office*